(12) United States Patent
Noguchi et al.

(10) Patent No.: US 10,416,013 B2
(45) Date of Patent: Sep. 17, 2019

(54) ULTRASONIC FLOW MEASURING APPARATUS DETECTING PROPAGATION TIME PERIOD FROM A ZERO CROSS POINT WHEN A PEAK WAVEFORM EXCEEDS A TRIGGER LEVEL

(71) Applicant: FUJI ELECTRIC CO., LTD., Kanagawa (JP)

(72) Inventors: Shingo Noguchi, Sagamihara (JP); Masami Kishiro, Hino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 162 days.

(21) Appl. No.: 15/660,989

(22) Filed: Jul. 27, 2017

(65) Prior Publication Data

US 2017/0322061 A1 Nov. 9, 2017

Related U.S. Application Data

(63) Continuation of application No. PCT/JP2016/053569, filed on Feb. 5, 2016.

(51) Int. Cl.
*G01F 1/66* (2006.01)
*G01P 5/24* (2006.01)

(52) U.S. Cl.
CPC ............. *G01F 1/667* (2013.01); *G01F 1/66* (2013.01); *G01P 5/24* (2013.01)

(58) Field of Classification Search
CPC ...................................................... G01F 1/667
See application file for complete search history.

(56) References Cited

U.S. PATENT DOCUMENTS

| 4,334,431 A | 6/1982 | Kohno et al. |
| 5,639,971 A | 6/1997 | Brown |
| 7,213,468 B2 | 5/2007 | Fujimoto |
| 2005/0219117 A1* | 10/2005 | Hiromori ............. G01S 7/4004 342/165 |
| 2011/0264387 A1 | 10/2011 | Bostrom |

(Continued)

FOREIGN PATENT DOCUMENTS

| CN | 102203601 A | 9/2011 |
| CN | 102639970 A | 8/2012 |

(Continued)

OTHER PUBLICATIONS

International Search Report for International Patent Application No. PCT/JP2016/053569, issued by the Japan Patent Office dated Mar. 1, 2016.

(Continued)

*Primary Examiner* — Harshad R Patel

(57) ABSTRACT

A measurement apparatus 100 comprises a measurement unit 10 to propagate, using sensors 11 and 12 provided in a pipe 99, a measurement wave in a medium 98 flowing through the pipe and receive the measurement wave, a trigger detecting section 21 to detect whether or not a level of the received measurement wave exceeds a predetermined trigger level, and a specifying section 22 to specify a reception timing of the measurement wave based on a waveform part in a period of the received measurement wave different from a period in which the level of the received measurement wave exceeds the trigger level.

10 Claims, 4 Drawing Sheets

(56) References Cited

U.S. PATENT DOCUMENTS

2011/0303014 A1* 12/2011 Kajitani .................. G01H 5/00
                                                                                73/632
2012/0272747 A1    11/2012  Sato
2015/0135850 A1     5/2015  Gotou et al.

FOREIGN PATENT DOCUMENTS

| | | |
|---|---|---|
| CN | 103226033 A | 7/2013 |
| CN | 104428638 A | 3/2015 |
| JP | 2006-003296 A | 1/2006 |
| JP | 2008-014771 A | 1/2008 |
| JP | 4271979 B2 | 6/2009 |

OTHER PUBLICATIONS

Extended European Search Report for European Patent Application No. 16886812.3, issued by the European Patent Office dated Dec. 11, 2017.

Office Action issued for counterpart Chinese Application No. 201680007690.0, issued by the State Intellectual Property Office of People's Republic of China dated Feb. 1, 2019.

\* cited by examiner

ULTRASONIC FLOW MEASURING APPARATUS DETECTING PROPAGATION TIME PERIOD FROM A ZERO CROSS POINT WHEN A PEAK WAVEFORM EXCEEDS A TRIGGER LEVEL

The contents of the following Japanese patent application are incorporated herein by reference:
NO. PCT/JP2016/053569 filed on Feb. 5, 2016.

BACKGROUND

1. Technical Field

The present invention relates to a measurement apparatus, a measurement method, and a measurement program.

2. Related Art

By measuring a time period in which an ultrasonic wave is propagated in a medium (referred to as a propagation time period) in each of a case where the ultrasonic wave is propagated in a flow direction of the medium and a case where the ultrasonic wave is propagated in a direction opposite to the flow direction, a velocity at which the medium flows (i. e. a flow velocity) or a rate (i. e. a flow rate), or a rate relating to thereof (collectively called a flow velocity and the like) can be measured from a difference between results of the propagation time periods.

One of methods of measuring the flow velocity and the like by using the ultrasonic wave is trigger method. With the trigger method, the ultrasonic wave is propagated in a medium and received, a signal component exceeding a trigger level is detected from the received signal (that is, a trigger is detected) to capture a reception wave, a peak waveform exceeding the trigger level is specified from one or more peak waveforms included in the reception wave to detect a zero cross point thereof, and a propagation time period is determined from a position of the zero cross point on a time axis.

Regarding the detection of the zero cross point, for example, an ultrasonic wave type flow rate measurement apparatus described in Patent Document 1 sequentially detects peak values of a plurality of peak waveforms included in the reception wave retroactively on a time axis, and compares the peak values with a noise level, specifies a peak waveform which is first below the noise level, and detects the zero cross point between the peak waveform and a peak waveform just before the peak waveform. Also, according to an ultrasonic wave flow rate meter described in Patent Document 2, a plurality of reference levels for detecting reception waves are prepared in a constant relation, and if a peak waveform of a plurality of peak waveforms included in the reception wave exceeds all of a constant number of reference levels from smaller ones of the reference levels that a peak waveform just before the peak waveform does not exceed, the zero cross point of the peak waveform is to be detected. That is, in the conventional method, the zero cross point is detected from the peak waveform for which the trigger is detected.

[Patent Document 1] Japanese Patent Application Publication 2008-14771
[Patent Document 2] Japanese Patent Application Publication 2006-3296

In order to accurately acquire the difference in the propagation time periods of the ultrasonic wave, it is necessary to detect a trigger for a peak waveform respectively corresponding to the reception waves obtained respectively by propagating the ultrasonic waves in the flow direction of the medium and the opposite direction. Also, in order to detect a position of the zero cross point with high accuracy, it is necessary to detect the zero cross point for a peak waveform having a large peak value with respect to a noise (i. e. a high S/N ratio). However, the peak waveform for which the trigger is to be detected and the peak waveform having a high S/N ratio do not necessarily coincide with each other.

SUMMARY

In a first aspect of the present invention, a measurement apparatus is provided, the measurement apparatus comprising a measurement unit to propagate a measurement wave in a medium and receive the measurement wave, a trigger detecting section to detect whether or not a level of the received measurement wave exceeds a predetermined trigger level, and a specifying section to specify a reception timing of the measurement wave based on a waveform part in a period of the received measurement wave different from a period in which the level of the received measurement wave exceeds the trigger level.

In a second aspect of the present invention, a measurement method is provided, the measurement method comprising a step of propagating a measurement wave in a medium and receiving the measurement wave, a step of detecting whether or not a level of the received measurement wave exceeds a predetermined trigger level, and a step of specifying a reception timing of the measurement wave based on a waveform part in a period different from a period of the received measurement wave, in which the level of the received measurement wave exceeds the trigger level.

In a third aspect of the present invention, a measurement program for measuring a propagation time period of propagating a measurement wave in a medium by a measurement apparatus is provided, the measurement program causing the measurement apparatus to function as a measurement unit to propagate the measurement wave in the medium and receive the measurement wave, a trigger detecting section to detect whether or not a level of the received measurement wave exceeds a predetermined trigger level, and a specifying section to specify a reception timing of the measurement wave based on a waveform part in a period of the received measurement wave different from a period in which the level of the received measurement wave exceeds the trigger level.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
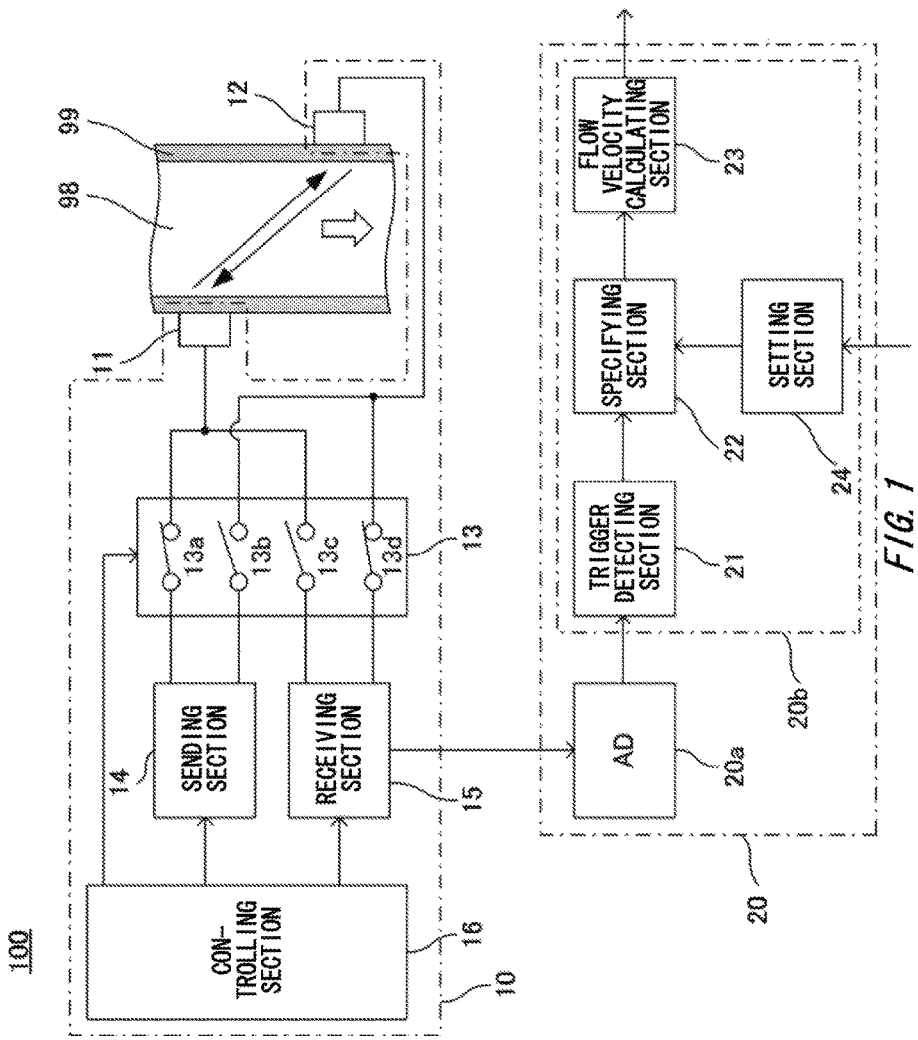
FIG. 1 shows a configuration of a measurement apparatus according to the present embodiment.

FIG. 1 shows a configuration of a measurement apparatus 100 according to the present embodiment. The measurement apparatus 100 is an apparatus which measures a flow velocity and the like at which a medium 98 flows in a pipe 99 by measuring a time period in which a measurement wave is propagated in the medium 98 (that is, a propagation time period), in order to measure the flow velocity and the like with high accuracy. Note that the medium 98 may be a liquid such as water or gas such as air. Also, the medium 98 flows in the pipe 99 downward in the drawing (in a direction shown by a void arrow), and this direction and a direction opposite to this direction respectively refer to a forward direction and an opposite direction with respect to the flow of the medium. The measurement apparatus 100 includes a measurement unit 10 and a calculating section 20.

The measurement unit 10 is a unit which propagates a measurement wave in the medium 98 flowing in the pipe 99 and receives the measurement wave. In the present embodiment, an ultrasonic wave is used as the measurement wave. The measurement unit 10 includes sensors 11 and 12, a switching section 13, a sending section 14, a receiving section 15, and a controlling section 16.

The sensors 11 and 12 are transceivers which transmit and receive ultrasonic waves. The sensors 11 and 12 are respectively fixed to positions on one side in a diameter direction on an outer surface of the provided pipe 99 (that is, the left side of the pipe 99 extending in a vertical direction in the drawing) and on the other side (that is, the right side), where one of the positions is shifted to one side in the flow direction of the medium 98 (that is, an upstream side) and the other one of the positions is shifted to the other side (that is, a downstream side). The sensors 11 and 12 receive ultrasonic waves sent from the sending section 14 and output the ultrasonic waves into the pipe 99, and also receive ultrasonic waves propagated in the medium 98 inside the pipe 99 and output the ultrasonic waves to the receiving section 15.

The switching section 13 is a unit which connects the sensors 11 and 12 to the sending section 14 or the receiving section 15, and includes four switching switches 13a to 13d. The switching section 13 receives a switching signal, for example, a high-level signal (H signal) from the controlling section 16, connects the sensor 11 to the sending section 14 via the switch 13a, and connects the sensor 12 to the receiving section 15 via the switch 13d. Also, the switching section 13 receives a low-level signal (L signal) from the controlling section 16, connects the sensor 11 to the receiving section 15 via the switch 13c, and connects the sensor 12 to the sending section 14 via the switch 13b.

The sending section 14 has an ultrasonic wave source (not shown) and receives, by using the ultrasonic wave source, a drive signal (for example, an ON signal) from the controlling section 16 to generate and output the ultrasonic wave. A piezoelectric element including a mixture, such as PZT and the like, can be adopted as the ultrasonic wave source.

The receiving section 15 receives the drive signal (for example, the ON signal) from the controlling section 16 and receives the ultrasonic wave to output, as a received signal, a voltage signal with a strength in accordance with an amplitude of the received ultrasonic wave. Note that the receiving section 15 has an amplifier (not shown) and may be set to amplify the received signal via the amplifier and output the received signal.

The controlling section 16 is a unit which controls operations of the switching section 13, the sending section 14, and the receiving section 15, generates and sends switching signals (for example, the H signal and the L signal) to the switching section 13, and generates and sends the drive signal (for example, the ON signal) to the sending section 14 and the receiving section 15. Here, the controlling section 16 synchronizes the switching signal and the drive signal, repeatedly generates the H signal and the L signal, for example, in a constant period, and synchronizes the H signal and the L signal to generate the ON signal. Accordingly, if the switching signal is the H signal and the drive signal is the ON signal, the ultrasonic wave output from the sending section 14 is sent to the sensor 11 via the switch 13a of the switching section 13, is output from the sensor 11 to the inside of the pipe 99, is propagated in the medium 98 inside the pipe 99 in the forward direction and received by the sensor 12, and is received by the receiving section 15 via the switch 13d. If the switching signal is the L signal and the drive signal is the ON signal, the ultrasonic wave output from the sending section 14 is sent to the sensor 12 via the switch 13b, is output from the sensor 12 to the inside of the pipe 99, is propagated in the medium 98 within the pipe 99 in the opposite direction (that is, the direction opposite to that of the same path as the case where the ultrasonic wave is propagated in the forward direction) and received by the sensor 11, and is received by the receiving section 15 via the switch 13c.

The calculating section 20 is a unit which processes the received signal output from the measurement unit 10 and calculates the flow velocity and the like of the medium 98. The calculating section 20 includes an AD converter 20a and a calculating section 20b.

The AD converter 20a is connected to the receiving section 15 of the measurement unit 10 to convert the received signal (that is, a voltage signal) input from the receiving section 15 into a digital signal. Accordingly, the received signal is a sequence of a digital value representing a signal waveform that varies with respect to time periods.

The calculating section 20b performs an operation process on the received signal to calculate the flow velocity and the like. The calculating section 20b actualizes a trigger detecting section 21, a specifying section 22, a flow velocity calculating section 23, and a setting section 24 by executing a control program.

The trigger detecting section 21 is connected to the AD converter 20a and detects a trigger for the received signal input from the AD converter 20a; that is, detects whether or not a level of the received signal exceeds a predetermined trigger level. Accordingly, the trigger detecting section 21 captures a waveform of the ultrasonic wave (i. e. the reception wave) propagated in the medium and received by the sensor 11 or 12 and outputs the waveform. Note that the details of the trigger detection will be described later.

The specifying section 22 is connected to the trigger detecting section 21, and specifies a reception timing of the ultrasonic wave according to the received signal input from the trigger detecting section 21, that is, according to the reception wave for which the trigger detection is performed and the waveform is captured. In the present embodiment, the specifying section 22 specifies the reception timing of the ultrasonic wave based on a waveform part in a period of the reception wave different from a period in which the level of the reception wave exceeds the trigger level, particularly, based on a waveform part in a period on the back side (the waveform part is set to a waveform part after N periods, where N is a positive integer), and outputs a result of the specification. Note that the details of the specification of the reception timing will be described later.

The flow velocity calculating section 23 is connected to the specifying section 22, calculates the flow velocity and the like of the medium 98 based on the reception timing of the ultrasonic wave input from the specifying section 22, and outputs the result to the outside. Here, the flow velocity calculating section 23 calculates the flow velocity and the like of the medium 98 based on the reception timings respectively specified for the received signal by propagating the ultrasonic wave by the specifying section 22 in the medium 98 in the forward direction (referred to as a forward signal) and the received signal by propagating the ultrasonic wave by the specifying section 22 in the medium 98 in the opposite direction (referred to as a backward signal). Note that the details of the calculation of the flow velocity and the like will be described later.

Note that, the flow velocity calculating section 23 may calculate the flow velocity and the like of the medium 98 also based on the reception timings respectively specified for two or more forward signals and two or more backward signals, not only based on the reception timings respectively specified for one forward signal and one backward signal. In this case, the flow velocity calculating section 23 may divide the two or more forward signals and the two or more backward signals into a plurality of groups respectively including one corresponding forward signal and one corresponding backward signal, for example, a plurality of groups respectively including the one forward signal and the one backward signal which are continuously received, and calculate differences in the reception timings for the respective plurality of groups to calculate the flow velocity and the like of the medium 98 according to the mean of the differences. Otherwise, the flow velocity calculating section 23 may calculate the mean of the reception timings with respect to the two or more forward signals and, similarly, calculate the mean of the reception timings with respect to the two or more backward signals to calculate the flow velocity and the like of the medium 98 according to a difference between the means.

The setting section 24 is an interface which is connected to the specifying section 22 and sends various setting information in accordance with designations from the outside to the specifying section 22. For example, the setting section 24 sends an integer N to the specifying section 22, the integer N being the information representing which period of each of one or more received signals after the level of each of one or more received signals exceeds the trigger level, a waveform part in the period to be used to specify the reception timing.

Figure 2:
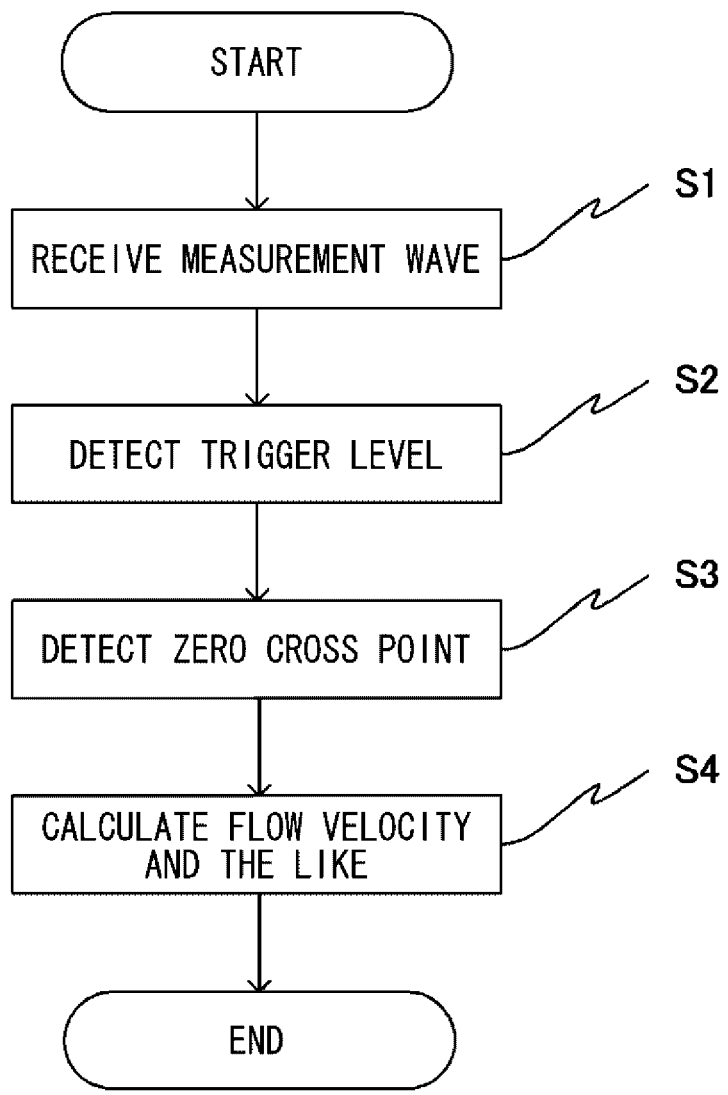
FIG. 2 shows a flow of a measurement method according to the present embodiment.

FIG. 2 shows a flow of a measurement method using the measurement apparatus 100 according to the present embodiment.

Figure 3:
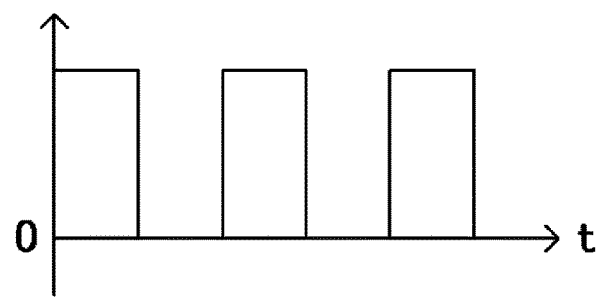
FIG. 3 shows one example of a waveform of a sending wave.

In a Step S1, the measurement unit 10 propagates the ultrasonic wave in the medium 98 flowing through the pipe 99 and receives the ultrasonic wave. Here, one example of a waveform of the ultrasonic wave generated by the sending section 14 of the measurement unit 10, that is, a sending wave, is shown in FIG. 3. The sending wave has a waveform repeating rectangular pulses with a positive amplitude for one or more times (three times in the present embodiment) in a constant period (for example, from several hundreds kHz to several MHz).

The measurement unit 10 repeats two operations described above, that is, the switching of the switching section 13 by the switching signal generated by the controlling section 16 and the driving of the sending section 14 and the receiving section 15 by the drive signal generated by the controlling section 16 at an time interval, such as 1 to 5 milliseconds. Accordingly, the forward signal is obtained by repeatedly propagating the ultrasonic wave in the medium 98 inside the pipe 99 from the sensor 11 in the forward direction and receiving the ultrasonic wave by the sensor 12, and the backward signal is obtained by propagating the ultrasonic wave in the medium 98 inside the pipe 99 from the sensor 12 in the opposite direction (that is, the direction opposite to the same path as that of a case where the ultrasonic wave is propagated in the forward direction) and receiving the ultrasonic wave by the sensor 11.

Figure 4:
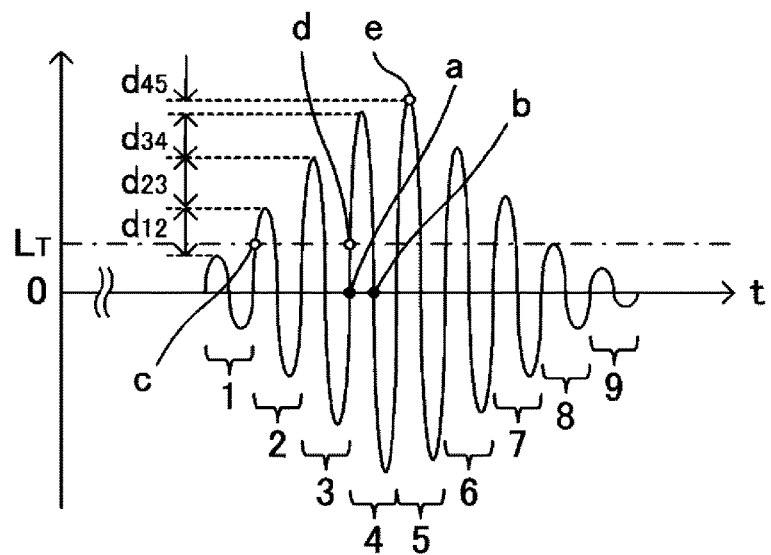
FIG. 4 shows one example of a waveform of a reception wave.

Here, one example of the waveform of the ultrasonic wave received by the receiving section 15, that is, a reception wave, is shown in FIG. 4, with respect to the sending of the sending wave of the waveform shown in FIG. 3. By reflecting the sending wave generated by the sending section 14 in elements within the measurement unit 10 or scattering the same within the pipe 99, the reception wave repeats in a period equal to the generation period of the rectangular pulses in the sending wave and includes a plurality of peak waveforms increasing/decreasing envelopes in a longer period. Here, a number of the peak waveforms is greater than a number (three in the present example) of the rectangular pulses in the sending wave, and nine peak waveforms are observed. Note that although one peak waveform is set to include a set of a mountain-shaped unit waveform having a positive amplitude (that is, a unit waveform having one maximum value) and a valley-shaped unit waveform having a negative amplitude (that is, a unit waveform having one minimum value), the peak waveform is set to only have a unit waveform having a positive amplitude, unless otherwise stated particularly. For each peak waveform, the maximum amplitudes are increased sequentially from a first wave to a fifth wave, and the maximum amplitudes are decreased sequentially from a fifth wave to a ninth wave.

For the peak waveforms from the first wave to the fifth wave in which the maximum amplitudes are sequentially increased, a difference $d_1$ between values of the maximum amplitudes (that is, peak values) of two continuous peak waveforms (the i-th wave and the j-th wave) satisfies a relation of $d_{12}>d_{23}>d_{34}>d_{45}$. That is, among the plurality of peak waveforms included in the reception wave, the difference in the peak values between front and back peak waveforms is larger as the peak waveforms are on the front side of the time axis. However, S/N ratio is lower as the peak waveforms are on the front side.

The received signals (the forward signal and the backward signal) received by the receiving section 15 are sequentially sent to the calculating section 20, and are sent to the trigger detecting section 21 via the AD converter 20a.

In a Step S2, the trigger for each of the received signals is detected by the trigger detecting section 21 of the calculating section 20.

First, the trigger detecting section 21 moves a capture range (i. e. a window) for each of the received signals in a positive direction of the time axis based on a time 0 at which the ultrasonic wave is sent by the sensor 11 or 12. A movement amount of the capture range is about a typical propagation time period of the ultrasonic wave in the medium 98, for example. Accordingly, in the received signals, the ultrasonic waves propagated in the medium and received by the sensor 11 or 12, that is, the entire reception waves (the peak waveforms from the first wave to the ninth wave in the reception waves of the waveforms shown in FIG. 4) are captured.

Next, the trigger detecting section 21 detects the maximum peak value (the value of point e in FIG. 4) from the peak values of the plurality of peak waveforms included in the waveforms of the reception waves to determine a trigger level $L_T$ by multiplying the value by a predetermined rate (for example, a rate input from the setting section 24).

Finally, the trigger detecting section 21 detects a position (a position of point c in FIG. 4, referred to as a trigger position) in which the amplitude of the reception wave first exceeds the trigger level $L_T$ (shown in FIG. 4 using a dashed-dotted line) to specify the peak waveform (the peak waveform of the second wave in the example of FIG. 4) including the trigger position from the plurality of peak waveforms included in the waveforms of the reception waves.

It is necessary to detect the triggers for the peak waveforms corresponding to the forward signal and the backward signal. Here, if the trigger level is determined in accordance with the peak waveform having a small difference in the peak values between the front and back peak waveforms of the plurality of peak waveforms included in the reception waves, for example, like the peak waveforms of the fourth wave and the fifth wave in the example shown in FIG. 4, the trigger may be detected for the peak waveforms different between the forward signal and the backward signal due to a distortion of the waveforms resulted from the noise and the like, for example. Therefore, the trigger level is preferably determined in accordance with the peak waveforms having a large difference in the peak values between the front and back peak waveforms. For example, in the example shown in FIG. 4, since the relation of $d_{12} > d_{23} > d_{34} > d_{45}$ in the peak waveforms of the first wave to the fifth wave in which the maximum amplitudes are sequentially increased is satisfied, it is desirable to determine the trigger level in accordance with the peak waveforms on the front side of the time axis. Here, in the present example, the rate is set to 0.3, for example. Accordingly, in either the forward signal or the backward signal, the trigger for the peak waveform of the second wave is to be detected.

In a Step S3, according to the specifying section 22 of the calculating section 20, the zero cross point is detected from any of the plurality of peak waveforms included in the waveforms of the reception wave to specify the reception timing of the ultrasonic waves from the position of the zero cross point on the time axis.

In order to detect the position of the zero cross point with high accuracy, it is desirable to perform the detection on peak waveforms having a high S/N ratio. Here, the peak waveform for which the trigger is to be detected by the trigger detecting section 21 does not necessarily coincide with the peak waveform having a high S/N ratio. Here, in the present embodiment, the specifying section 22 specifies the peak waveform which is different from the peak waveform for which the trigger is detected from the plurality of peak waveforms included in the waveforms of the reception wave to detect the zero cross point. As for further details, for each of the forward signal and the backward signal, the specifying section 22 specifies the peak waveform corresponding to a period after the same period number (after N periods) from the peak waveforms for which the trigger is detected to detect the respective zero cross points. Here, N is an integer of 1 or more, and is determined to 2 in the example shown in FIG. 4.

Regarding the setting of the integer N, since the peak waveforms having a large peak value of the plurality of peak waveforms included in the waveforms of the reception wave, for example, the peak waveforms of the fourth wave and the fifth wave in the example shown in FIG. 4, are influenced by the reflection of the ultrasonic wave and the like in the elements within the measurement unit 10, the distortion of the waveforms may be large due to the external environment, such as the temperature. Here, it is desirable to determine the integer N so as to detect the zero cross point for the peak waveform in which the S/N ratio is large but the peak value is not necessarily maximum, the peak waveform hardly influenced by the external environment.

A method of specifying the peak waveform corresponding to the period after N periods from the peak waveforms for which the trigger is detected by the specifying section 22 is specifically described in the followings. First, the specifying section 22 acquires a repetition period of the peak waveforms. The repetition period is equal to the repetition period of rectangular pulses in the sending wave. Then, by multiplying the repetition period by the period number N received from the setting section 24, the time period from the trigger position (the point c in FIG. 4) to a zero cross trigger position (a point d in FIG. 4) may be calculated. Accordingly, the zero cross trigger position can be determined by a sum of the time period to the trigger position (the point c in FIG. 4) and the repetition period×N. Then, the specifying section 22 specifies the peak waveform including the zero cross trigger position (the peak waveform of the fourth wave in the example shown in FIG. 4) and detects positions of zero cross points a and b on the time axis, the zero cross points a and b being right before and after the positive portion (the unit waveform having a positive amplitude). The specifying section 22 specifies an intermediate position between the two zero cross points a and b as the reception timing of the ultrasonic wave.

Note that the integer N may be set to automatically set according to an instruction from the setting section 24. In this case, the specifying section 22 may specify each peak waveform with respect to N which is, for example, from 1 to any value, and detects the zero cross point of the peak waveform. A value of N at which the reception timing of the measurement wave obtained from the above result or the flow velocity and the like obtained from the reception timing has a stationary value may be employed.

Note that, not only specifying the peak waveform corresponding to the period after the same period number (after N periods) from the peak waveforms for which the trigger is detected for each of the forward signal and the backward signal to specify the zero cross point, the specifying section 22 may be set to select the peak waveform in an earliest period from among the peak waveforms in the periods having a peak value equal to or greater than a reference ratio with respect to the maximum peak value (the value of the point e in FIG. 4) for each of the forward signal and the backward signal to specify the zero cross point for the peak waveform. The reference ratio may be determined to 0.7, for example.

In a Step S4, according to the flow velocity calculating section 23 of the calculating section 20, the flow velocity and the like of the medium 98 is calculated based on the reception timing of the measurement wave specified for each of the forward signal and the backward signal in the Step S3. The flow velocity calculating section 23 calculates propagation time periods T1 and T2 respectively for the case where the ultrasonic wave is propagated in the medium 98 in the forward direction and the case where the ultrasonic wave is propagated in the opposite direction by subtracting an offset τ, for example, a delay time period derived from the sending of the ultrasonic wave within the measurement unit 10 and the like, from the reception timing specified for each of the forward signal and the backward signal. Also, the flow velocity calculating section 23 calculates a propagation time period difference ΔT by a difference in the specified reception timings of each of the forward signal and the backward signal or a difference between the propagation time periods T1 and T2. The flow velocity calculating section 23 calculates the flow velocity V of the medium 98 by using the propagation time periods T1 and T2 and the propagation time period difference ΔT, as $V=\gamma \Delta T/((T1+T2)/2-(2\tau))^2$. Here, γ is a constant derived from the structure and the like of the pipe 99. Note that the flow velocity calculating section 23 may calculate the flow rate of the medium 98 by multiplying the calculated flow velocity by a cross-sectional area of the pipe 99. Finally, the flow velocity calculating section 23 outputs the calculation result of the flow rate and the like to the outside. Accordingly, a series of flows ends.

The measurement apparatus 100 of the present embodiment includes a measurement unit 10 to propagate a measurement wave in a medium 98 flowing in the pipe 99 using the sensors 11 and 12 provided in the pipe 99 and receive the measurement wave, a trigger detecting section 21 to detect whether or not a level of the received measurement wave exceeds a predetermined trigger level, and a specifying section 22 to specify a reception timing of the measurement wave based on a waveform part in a period of the received measurement wave different from a period in which the level of the received measurement wave exceeds the trigger level. The specifying section 22 may detect a trigger for the peak waveform on the front side of the time axis on which a difference in the peak values between the front and back peak waveforms is large so as to perform the trigger detection for the peak waveform corresponding to the forward signal and the backward signal by specifying the reception timing of the measurement wave based on the waveform part in the period different from the period in which the trigger level detected by the trigger detecting section 21 is exceeded, and may detect the zero cross point for the peak waveform on the back side of the time axis on which the S/N ratio is high to detect the position of the zero cross point with high accuracy.

Note that in the measurement apparatus 100 according to the present embodiment, two sensors 11 and 12 are provided to transmit and receive the measurement waves, two measurement waves in the medium are respectively propagated in the forward direction and the opposite direction by transmitting and receiving the measurement waves between the sensors 11 and 12, and the flow velocity and the like of the medium is calculated from the difference in the reception timings between the respective measurement waves; however, the number of the sensors is not limited to 2 and may be 3 or more, and the measurement waves may be propagated in the forward direction or the opposite direction along two (or two or more) different propagation paths, not limited to propagate the measurement waves in the forward direction and the opposite direction along one propagation path. For example, a sending sensor may be provided on one side of an outer surface of the pipe 99 and first and second receiving sensors may be respectively provided in positions on the other side of the outer surface of the pipe 99, the positions spaced from the sending sensor in the forward direction and the opposite direction by a constant distance; accordingly, the measurement wave may be sent from the sending sensor in the forward direction and be received by the first receiving sensor, and another measurement wave may be sent from the sending sensor in the opposite direction and be received by the second receiving sensor. Also, the sending sensor may be provided on one side of the outer surface of the pipe 99 and a plurality of receiving sensors may be provided in positions on the other side of the outer surface of the pipe 99, the positions different from that of the sending sensor in the flow direction of the medium, to send two or more measurement waves from the sending sensor in different directions and to respectively receive the two or more measurement waves by the plurality of receiving sensors.

Note that in the measurement apparatus 100 according to the present embodiment, although the calculating section 20b included in the calculating section 20 is configured to execute the control program to actualize the trigger detecting section 21, the specifying section 22, the flow velocity calculating section 23, and the setting section 24, that is, as a digital circuit, the calculating section 20b is not limited to this and may be configured as an analog circuit. In this case, for example, the trigger detecting section 21 may be configured using a comparator which inputs a voltage value of the received signal input from the AD converter 20a and a voltage value corresponding to the trigger level and outputs a voltage signal representing a comparison result thereof.

Also, in the measurement apparatus 100 of the present embodiment, although the ultrasonic wave is used as the measurement wave to be propagated in the medium, any measurement wave, for example, a sound wave, may be used to be propagated in the medium 98 flowing in the pipe 99 from the outside of the pipe 99, not limited to the ultrasonic wave.

Also, although the measurement apparatus 100 of the present embodiment is set as an apparatus which measures the propagation time period when the ultrasonic wave is propagated in the medium in the flow direction and the propagation time period when the ultrasonic wave is propagated in the medium in the opposite direction to obtain the flow velocity of the medium from the difference in the result thereof, the measurement apparatus 100 of the present embodiment is not limited to the above and may be set as an apparatus which measures the propagation time period of the ultrasonic wave in the medium to specify the medium based on the result or an apparatus which measures a propagation distance such as a thickness and a level of the medium.

Figure 5:
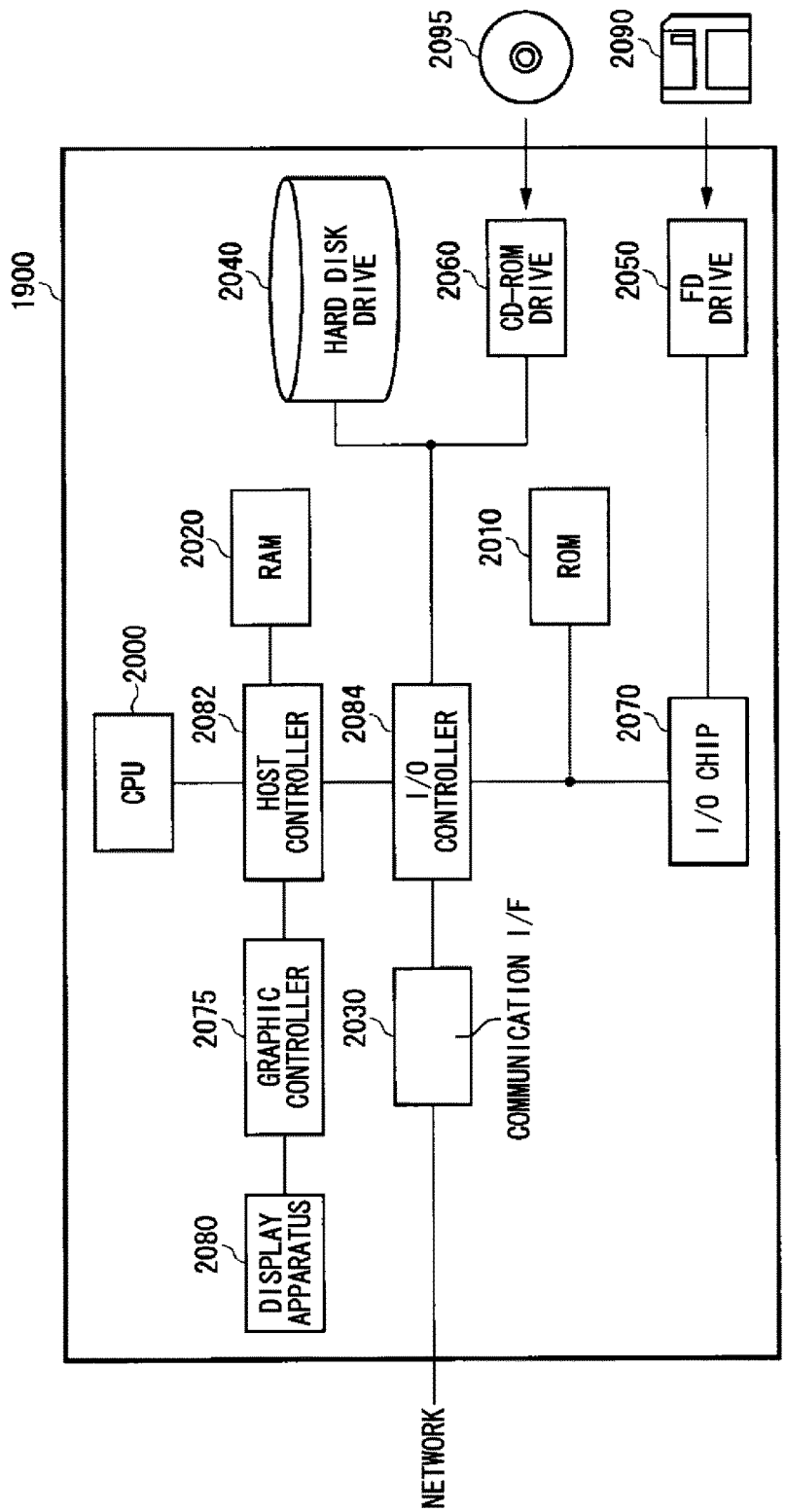
FIG. 5 shows one example of a hardware configuration of a computer according to the present embodiment.

FIG. 5 shows one example of a hardware configuration of a computer 1900 according to the present embodiment. The computer 1900 according to the present embodiment includes a CPU peripheral section having a CPU 2000 and a RAM 2020 connected with each other via a host controller 2082, a graphic controller 2075 and a display apparatus 2080, an input/output section having a communication interface 2030 connected to the host controller 2082 by an input/output controller 2084, a hard disk drive 2040, and a CD-ROM drive 2060, and a legacy input/output section having a ROM 2010 connected to the input/output controller 2084, a flexible disk drive 2050, and an input/output chip 2070.

The host controller 2082 connects the RAM 2020 and the CPU 2000 which accesses the RAM 2020 at a high transfer rate and the graphic controller 2075. The CPU 2000 operates based on programs stored in the ROM 2010 and the RAM 2020 to perform controlling on each section. The graphic controller 2075 acquires image data generated by the CPU 2000 and the like on a frame buffer provided within the RAM 2020 to display the image data on the display apparatus 2080. Instead of this, the graphic controller 2075 may include a frame buffer which stores therein image data generated by the CPU 2000 and the like.

The input/output controller 2084 connects the host controller 2082 and the communication interface 2030, the hard disk drive 2040, and the CD-ROM drive 2060 which are relatively high-speed input/output apparatuses. The communication interface 2030 communicates with other apparatuses via a network. The hard disk drive 2040 stores programs and data used by the CPU 2000 within the computer 1900. The CD-ROM drive 2060 reads the programs or data from the CD-ROM 2095 and provides the read programs or data to the hard disk drive 2040 via the RAM 2020.

Also, the ROM 2010, and relatively low-speed input/output apparatuses of the flexible disk drive 2050 and the input/output chip 2070 are connected to the input/output controller 2084. The ROM 2010 stores a boot program executed by the computer 1900 when the computer 1900 runs and/or programs and the like which depend on hardware of the computer 1900. The flexible disk drive 2050 reads programs or data from the flexible disk 2090 and provides the read programs or data to the hard disk drive 2040 via the RAM 2020. The input/output chip 2070 connects the flexible disk drive 2050 to the input/output controller 2084, and connects various input/output apparatuses to the input/output controller 2084, for example, via a parallel port, a serial port, a keyboard port, a mouse port, and the like.

The programs provided to the hard disk drive 2040 via the RAM 2020 are stored in a recording media such as the flexible disk 2090, the CD-ROM 2095, an IC card, or the like to be provided by users. The programs are read from the recording media and installed to the hard disk drive 2040 within the computer 1900 via the RAM 2020 and executed in the CPU 2000.

The programs which are installed in the computer 1900 and cause the computer 1900 to function as the measurement apparatus 100 include a trigger detection module, a specifying module, a flow velocity calculation module, and a setting module. These programs or modules act on the CPU 2000 and the like to cause the computer 1900 to function respectively as the trigger detecting section 21, the specifying section 22, the flow velocity calculating section 23, and the setting section 24.

Information processing described in these program is read to the computer 1900, and accordingly the computer 1900 functions as the trigger detecting section 21, the specifying section 22, the flow velocity calculating section 23, and the setting section 24 which are specific means realized by cooperation between software and the above-described various hardware resource. Then, by achieving operations or processing on information corresponding to the purpose of usage of the computer 1900 in the present embodiment with these specific means, the specific measurement apparatus 100 corresponding to the purpose of usage is constructed.

As one example, when communication between the computer 1900 and an external apparatus and the like is to be performed, the CPU 2000 executes a communication program loaded on the RAM 2020 and instructs a communication processing on the communication interface 2030 based on the processing content described in the communication program. The communication interface 2030 is controlled by the CPU 2000 to read the sending data stored in the sending buffer region provided on a storage apparatus, such as the RAM 2020, the hard disk drive 2040, the flexible disk 2090, or the CD-ROM 2095 and the like, and send to the network, or to write the reception data received from the network on reception buffer region and the like provided on the storage apparatus. In this way, the communication interface 2030 may transfer the transmission/reception data between the storage apparatuses by DMA (direct memory access) method, or instead of this, the CPU 2000 may read data from the storage apparatus or the communication interface 2030 being the transfer source and write the read data to the communication interface 2030 or the storage apparatus being the transfer source to transfer the transmission/reception data.

Also, the CPU 2000 causes all or required portions of files, database, or the like stored in the external storage apparatus, such as the hard disk drive 2040, the CD-ROM drive 2060 (CD-ROM 2095), the flexible disk drive 2050 (the flexible disk 2090), to be read into the RAM 2020 by DMA transfer and the like to perform various processes on the data in the RAM 2020. Then, the CPU 2000 writes back the processed data to an external storage apparatus by DMA transfer and the like. In such a process, since the RAM 2020 can be regarded as temporarily holding contents of the external storage apparatus, the RAM 2020, the external storage apparatus, and the like in the present embodiment are collectively called a memory, storage section, storage apparatus, or the like. Various programs and various information, such as data, tables, database and the like in the present embodiment, are stored on such a storage apparatus to be subjects of information processing. Note that the CPU 2000 may hold a part of the RAM 2020 in a cache memory to perform writing on the cache memory. Since the cache memory serves a part of the functions of the RAM 2020 in such an embodiment as well, in the present embodiment, the cache memory is also regarded as being included in the RAM 2020, memory, and/or storage apparatus, unless it is stated by distinguishing them.

Also, the CPU 2000 performs, on the data read from the RAM 2020, various processes including various operations, information processing, conditional judgment, information searching/replacement, and the like described in the present embodiment which are designated by an instruction string of the program and writes the data back into the RAM 2020. For example, in a case where the conditional judgment is to be performed, the CPU 2000 determines whether or not the various variables shown in the present embodiment satisfy the conditions such as "greater than", "less than", "equal to or greater than", "equal to or less than", "equal to", or the like by comparing with other variables or constants, and if the conditions are satisfied (or if the conditions are not satisfied), branches to different instruction strings or calls up a subroutine.

Also, the CPU 2000 may search the information stored in the files, database, or the like within the storage apparatus. For example, in a case where a plurality of entries in which attribute values of a second attribute are respectively associated with attribute values of a first attribute are stored in the storage apparatus, the CPU 2000 may search, from the plurality of entries stored in the storage apparatus, an entry which matches the condition designated by the attribute value of the first attribute and read the attribute value of the second attribute stored in the entry to obtain the attribute value of the second attribute associated with the attribute value of the first attribute satisfying the predetermined condition.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

The programs or modules shown above may be stored in an external recording media. As the recording media, other than the flexible disk 2090 and the CD-ROM 2095, an optical recording media such as DVD or CD, a magneto-optical recording media such as MO, a tape media, a semiconductor memory such as an IC card, and the like may be used. Also, a storage apparatus such as a hard disk or RAM provided in a server system connected to a dedicated communication network or internet may be used as the recording media to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As clearly described above, according to the embodiments of the present invention, the measurement apparatus, the measurement method, and the measurement program can be achieved.

What is claimed is:

1. A measurement apparatus, comprising:
    a measurement unit including at least two transceivers configured to output an ultrasonic wave into a medium and receive the ultrasonic wave propagated through the medium; and
    a processor or circuitry configured to:
        detect whether or not a level of the received ultrasonic wave exceeds a predetermined trigger level; and
        specify a reception timing of the ultrasonic wave based on a waveform part in a reception timing specifying period of the received ultrasonic wave different from a trigger detecting period in which the level of the received ultrasonic wave exceeds the trigger level, wherein
    the trigger level is determined such that peak value differences of a waveform part in the trigger detecting period with respect to waveform parts at front and back periods adjacent to the trigger detecting period are larger than peak value differences of the waveform part based on which the reception timing is specified with respect to waveform parts at front and back periods adjacent to the reception timing specifying period.

2. The measurement apparatus according to claim 1, wherein
    the processor or circuitry is further configured to specify the reception timing of the ultrasonic wave based on a waveform part in a period of the received ultrasonic wave after the trigger detecting period in which the level of the received ultrasonic wave exceeds the trigger level.

3. The measurement apparatus according to claim 1, wherein the processor or circuitry is further configured to detect a zero cross point of the waveform part in the reception timing specifying period, and specifies the reception timing of the ultrasonic wave based on the detected zero cross point.

4. The measurement apparatus according to claim 1, wherein
    the at least two transceivers are further configured to output two ultrasonic waves into the medium in mutually opposite directions and receive the two ultrasonic waves propagated through the medium, and
    the processor or circuitry is further configured to calculate a flow velocity of the medium based on respective reception timings of the two ultrasonic waves.

5. The measurement apparatus according to claim 4, wherein
    the processor or circuitry is further configured to calculate a propagation time period difference between the two ultrasonic waves when the two ultrasonic waves are propagated in mutually opposite directions based on the respective reception timings of the two ultrasonic waves, and calculate the flow velocity of the medium based on the propagation time period difference.

6. The measurement apparatus according to claim 4, wherein
    the processor or circuitry is further configured to set, in accordance with a designation from outside, for each of two or more ultrasonic waves, a period among periods after the trigger level is exceeded that includes a waveform part to be used to specify the reception timing.

7. The measurement apparatus according to claim 4, wherein
    the processor or circuitry is further configured to select a waveform part in an earliest period from among waveform parts in periods having peaks equal to or greater than a reference ratio with respect to a peak point in one ultrasonic wave of two or more ultrasonic waves, and specifies the reception timing of the one ultrasonic wave based on the selected waveform part.

8. The measurement apparatus according to claim 1, wherein
    the medium is a fluid.

9. A measurement method, comprising:
    outputting an ultrasonic wave into a medium and receiving the ultrasonic wave propagated through the medium;
    detecting whether or not a level of the received ultrasonic wave exceeds a predetermined trigger level; and
    specifying a reception timing of the ultrasonic wave based on a waveform part in a reception timing specifying period of the received ultrasonic wave different from a trigger detecting period in which the level of the received ultrasonic wave exceeds the trigger level, wherein
    the trigger level is determined such that peak value differences of a waveform part in the trigger detecting period with respect to waveform parts at front and back periods adjacent to the trigger detecting period are larger than peak value differences of the waveform part based on which the reception timing is specified with respect to waveform parts at front and back periods adjacent to the reception timing specifying period.

10. A non-transitory computer readable medium comprising a measurement program for measuring a propagation time period in which an ultrasonic wave output from and received at at least two transceivers is propagated in a medium, the measurement program causing the computer to:
- detect whether or not a level of the received ultrasonic wave exceeds a predetermined trigger level; and
- specify a reception timing of the ultrasonic wave based on a waveform part in a period of the received ultrasonic wave different from a period in which the level of the received ultrasonic wave exceeds the trigger level, wherein
- the trigger level is determined such that peak value differences of a waveform part in the trigger detecting period with respect to waveform parts at front and back periods adjacent to the trigger detecting period are larger than peak value differences of the waveform part based on which the reception timing is specified with respect to waveform parts at front and back periods adjacent to the reception timing specifying period.

* * * * *